(12) United States Patent  (10) Patent No.: US 8,235,406 B2
Azekatsu  (45) Date of Patent: Aug. 7, 2012

(54) DAMPER UNIT

(75) Inventor: Yoshitomo Azekatsu, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 203 days.

(21) Appl. No.: 12/757,700

(22) Filed: Apr. 9, 2010

(65) Prior Publication Data

US 2010/0270761 A1 Oct. 28, 2010

(30) Foreign Application Priority Data

Apr. 24, 2009 (JP) ................................. 2009-105876

(51) Int. Cl.
B60G 17/00 (2006.01)
F16F 5/00 (2006.01)

(52) U.S. Cl. ................. 280/124.16; 267/64.17; 188/315

(58) Field of Classification Search ............... 280/6.157, 280/6.159, 124.157, 124.16, 124.161, 124.162; 137/539, 543.19; 188/322.13, 322.14, 322.15, 188/322.19, 322.2, 322.21, 322.22, 297, 188/313, 314, 315, 316, 317, 318; 267/64.17, 267/124, 218, DIG. 2
See application file for complete search history.

(56) References Cited

U.S. PATENT DOCUMENTS 2,879,057 A    3/1959  Heiss
7,370,849 B2 * 5/2008  Beck .......................... 267/64.17
8,042,791 B2 * 10/2011 Schmitz et al. ............ 267/64.17
8,052,128 B2 * 11/2011 Kirchner et al. ........... 267/64.17
2007/0227847 A1  10/2007 Nogami et al.
2008/0029939 A1  2/2008  Beck et al.
2009/0033009 A1  2/2009  Kirchner et al.

FOREIGN PATENT DOCUMENTS

| DE | 198 18 116 C1 | 7/1999 |
| DE | 199 22 877 A1 | 12/2000 |
| JP | 10-211810 | 8/1998 |
| JP | 10-211810 A | 8/1998 |
| JP | 2007-292284 A | 11/2007 |

* cited by examiner

Primary Examiner — Joseph Rocca
(74) Attorney, Agent, or Firm — Carrier Blackman & Associates, P.C.; Joseph P. Carrier; William D. Blackman

(57) ABSTRACT

A damper unit includes: a cylinder, connected to a reservoir; a piston dividing an interior of the cylinder into two chambers; a piston rod which is connected to the piston at one end; an inner sleeve adapted to be accommodated within a hollow recess portion in the piston rod; a pump rod; a pump unit which performs pumping for generating a force with which the piston is pushed out of the cylinder or the piston is drawn into the cylinder; a hydraulic fluid releasing unit configured to release the a hydraulic fluid within the inner sleeve and the pump rod to the reservoir or the two chambers when the piston reaches a predetermined position relative to the cylinder within a sliding range thereof by pumping of the pump unit; and a control unit configured to control the predetermined position where the hydraulic fluid is released.

10 Claims, 10 Drawing Sheets

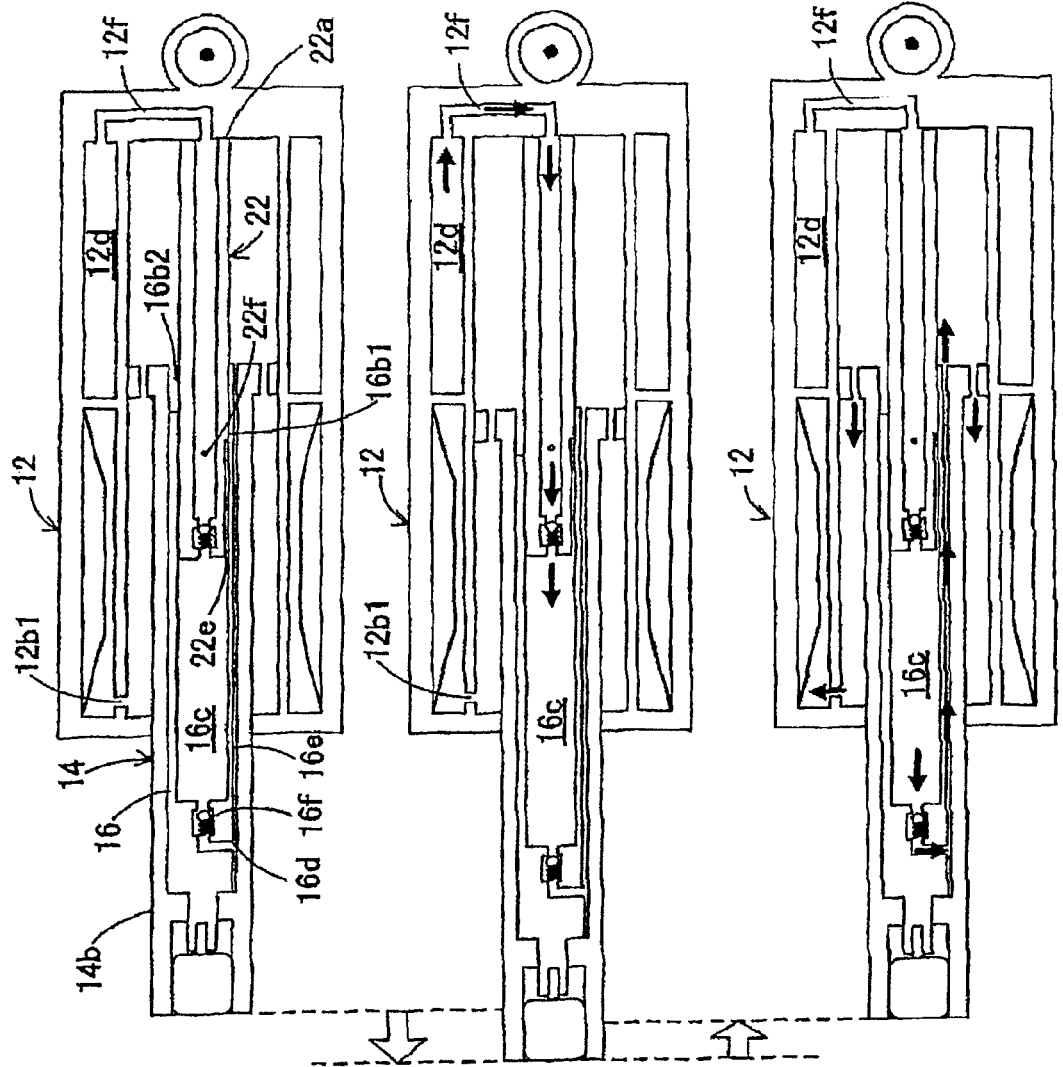

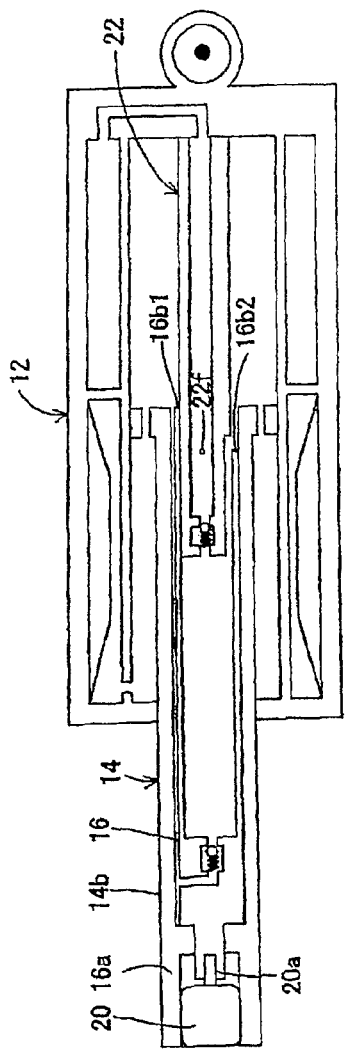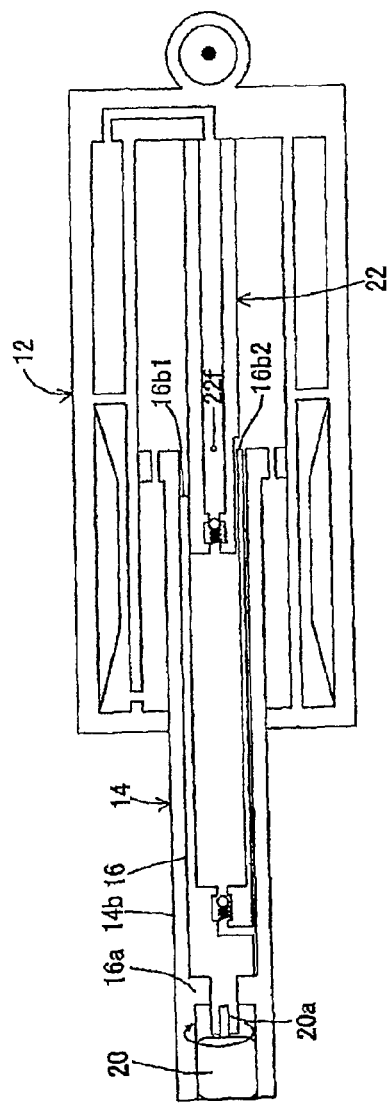
FIG. 7A  VEHICLE HEIGHT – LOW
FIG. 7B  VEHICLE HEIGHT – HIGH

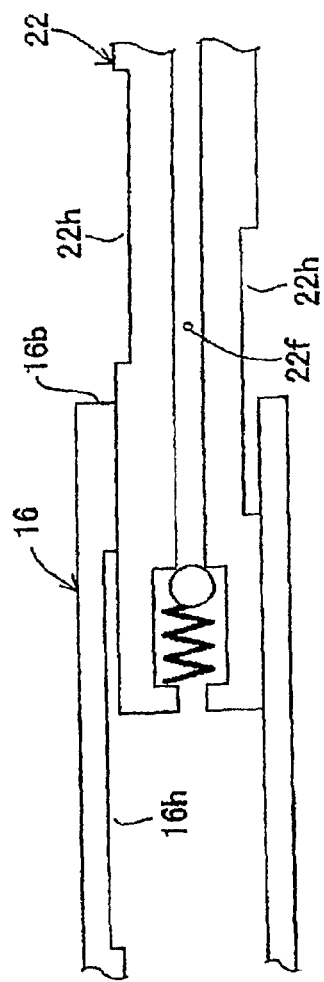
FIG. 11A BEFORE START (WITH SOLENOID VALVE OPEN)
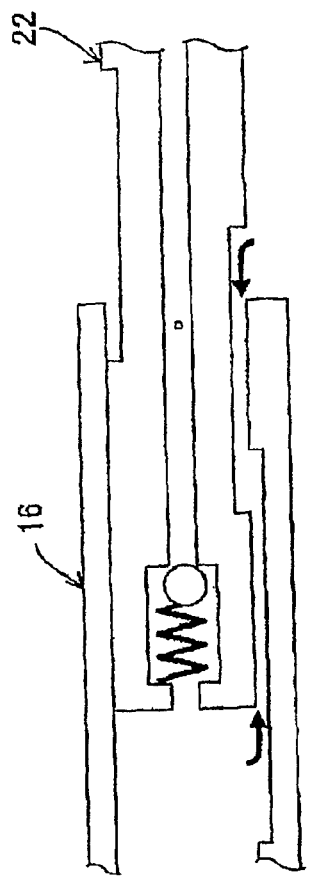
FIG. 11B DURING RUNNING (AFTER PUMPING) (WITH SOLENOID VALVE CLOSED)
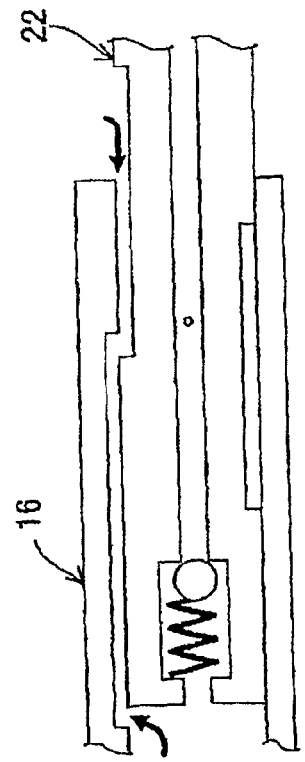
FIG. 11C DURING RUNNING (AFTER PUMPING) (WITH SOLENOID VALVE CLOSED)

DAMPER UNIT

BACKGROUND

1. Field of the Invention

The present invention relates to a damper unit and more particularly to a damper unit which is preferable for disposition between springs of a suspension system of a motor vehicle not only to damp the vibration of the springs but also to control the height of a vehicle so as to stay at a desired height.

2. Description of the Related Art

A technique described in Patent Document is known as a damper unit for a motor vehicle. In the technique described in JP-A-2007-292284, a working or hydraulic oil (a hydraulic fluid) is supplied to a lower chamber of a cylinder in association with a vertical movement of a piston so as to push a piston rod upwards to cause it to extend to raise the vehicle height on one hand. On the other hand, when the vehicle height reaches a predetermined vehicle height, by a leveling port opened in a pump rod being caused to communicate with the lower chamber, the vehicle height is designed to be prevented from being raised any further.

In this way, in the technique described in JP-A-2007-292284, the vehicle height to be held is determined by the position of the leveling port so opened for releasing the pumping operation. Therefore, JP-A-10-211810 proposes a technique for controlling an axial height in which a female screw member and a male screw member made to mesh with the female screw member are accommodated in an interior of a piston rod for connection with a pump rod (a pump tube), and a pumping operation is designed to be released by moving the female screw member in an axial direction by an actuator.

In this way, in the technique described in JP-A-10-211810, since the axial height control is implemented by adopting the configuration in which the pumping operation is released by causing the female screw member to move in the axial direction or, specifically, causing the female screw member to rotate by the actuator to cause the male screw member meshing with the female screw member to move or, more specifically, converting the rotational motion of the female screw member by the actuator into the linear motion of the male screw member, not only does the configuration become complex, but also a space is required within the piston rod which corresponds to a distance over which not only the female screw member but also the male screw member moves, this making it difficult for the damper unit to be laid out within a limited space such as one within a wheel house when trying to dispose the damper unit in such a space.

SUMMARY

An object thereof is to provide a damper unit which can not only damp a reaction force to an external force but also hold a piston in a desired position relative to a cylinder.

According to an aspect of the invention, there is provided a damper unit, including: a cylinder, connected to a reservoir, in which a hydraulic fluid is sealed; a piston dividing an interior of the cylinder into two chambers, the two chambers configured to pass the hydraulic fluid from one to the other so as to damp vibration from an outside; a piston rod which is connected to the piston at one end, while being caused to extend outwards of the cylinder at the other end and in which a hollow recess portion is provided in an axial direction; an inner sleeve which exhibits a cylindrical shape and which is adapted to be accommodated rotatably within the hollow recess portion in the piston rod; a pump rod which is provided at an axial end portion of an inner circumferential surface of the cylinder at one end, while being inserted into an interior of the inner sleeve from a distal end side at the other end and in an interior of which a passage is provided; a pump unit configured to perform pumping for generating a force with which the piston is pushed out of the cylinder or the piston is drawn into the cylinder by moving the hydraulic fluid in the inner sleeve and the pump rod by a change in relative position between the inner sleeve and the pump rod which is triggered in association with a stroke of the piston rod; a hydraulic fluid releasing unit configured to releases the hydraulic fluid within the inner sleeve and the pump rod to the reservoir or the two chambers when the piston reaches a predetermined position relative to the cylinder within a sliding range thereof by pumping of the pump unit; and a control unit configure to control the predetermined position where the hydraulic fluid is released by the hydraulic fluid releasing unit.

The hydraulic fluid releasing unit may include: an orifice provided in a passage through which the hydraulic fluid flows on an inner circumferential surface of the pump rod and communicating with the reservoir; a closing portion formed at a distal end side of the inner sleeve for closing the orifice in at least two positions which are different in an axial direction; and an actuator adapted to move the inner sleeve relative to the piston rod for controlling the position of the closing portion relative to the orifice.

The pump rod may include a groove having a predetermined axial length for establishing a communication between the passage of the hydraulic fluid on the inner circumferential surface and either of the two chamber, and the hydraulic fluid releasing unit may cause the actuator to establish a communication between a passage within the inner sleeve and the two chambers via the groove and establishes a communication between the reservoir and the two chambers via the orifice so as to release the hydraulic fluid within the inner sleeve and the pump rod.

The orifice may be provided in a position which lies within the axial length of the groove of the inner sleeve and which deviates in a radial direction from the groove.

The actuator may control a relative position between the closing portion of the inner sleeve and the groove by rotating the inner sleeve in a circumferential direction.

The piston position holding unit may include: an orifice provided in a passage through which the hydraulic fluid flows on an inner circumferential surface of the pump rod and adapted to communicate with the reservoir; a closing portion formed at a distal end side of the inner sleeve for closing the orifice; at least one primary groove portion formed on an inner circumferential surface of the inner sleeve; at least two secondary groove portions formed in different positions in an axial direction on an outer circumferential surface of the pump rod; and an actuator connected to the inner sleeve for rotating the inner sleeve relative to the piston rod through an angle at which the primary groove portion generates a radial gap with the secondary grooves formed on the pump rod.

According to another aspect of the invention, there is provided a method for controlling a height of a vehicle, including: providing a damper unit comprising: a cylinder, connected to a reservoir, in which a hydraulic fluid is sealed; a piston dividing an interior of the cylinder into two chambers, the two chambers configured to pass the hydraulic fluid from one to the other so as to damp vibration from an outside; a piston rod which is connected to the piston at one end, while being caused to extend outwards of the cylinder at the other end and in which a hollow recess portion is provided in an axial direction; an inner sleeve which exhibits a cylindrical shape and which is adapted to be accommodated rotatably within the hollow recess portion in the piston rod; and a pump rod which is provided at an axial end portion of an inner circumferential surface of the cylinder at one end, while being inserted into an interior of the inner sleeve from a distal end side at the other end and in an interior of which a passage is provided; pumping for generating a force with which the piston is pushed out of the cylinder or the piston is drawn into the cylinder by moving the hydraulic fluid in the inner sleeve and the pump rod by a change in relative position between the inner sleeve and the pump rod which is triggered in association with a stroke of the piston rod; releasing the hydraulic fluid within the inner sleeve and the pump rod to the reservoir or the two chambers when the piston reaches a predetermined position relative to the cylinder within a sliding range thereof by the pumping; and controlling the predetermined position where the hydraulic fluid is released.

The method may further include: providing an orifice provided in a passage through which the hydraulic fluid flows on an inner circumferential surface of the pump rod and communicating with the reservoir, and a closing portion formed at a distal end side of the inner sleeve for closing the orifice in at least two positions which are different in an axial direction; and moving the inner sleeve relative to the piston rod for controlling the position of the closing portion relative to the orifice.

The method may further include: providing a groove having a predetermined axial length for establishing a communication between the passage of the hydraulic fluid on the inner circumferential surface and either of the two chamber; establishing a communication between a passage within the inner sleeve and the two chambers via the groove; and establishing a communication between the reservoir and the two chambers via the orifice so as to release the hydraulic fluid within the inner sleeve and the pump rod.

In the method, a relative position between the closing portion of the inner sleeve and the groove may be controlled by rotating the inner sleeve in a circumferential direction.

The damper unit according to the first aspect of the invention comprises the piston rod which is connected to the piston at one end and which is caused to extend outwards of the cylinder at the other end and in which the hollow recess portion is opened in the axial direction, the inner sleeve which exhibits the cylindrical shape and which is accommodated rotatably within the hollow recess portion in the piston rod, the pump rod which is fixed to the bottom of the cylinder at one end while being inserted into the interior of the inner sleeve from the distal end side at the other end and in which the passage is opened in the interior thereof, the pump unit which causes the hydraulic fluid to flow from the reservoir to at least either of the two chambers via the passage when the pump rod is displaced relative to the inner sleeve in response to the stroke of the piston rod so as to cause the piston to perform pumping relative to the cylinder, and the piston position holding unit which causes the pump unit to discharge the hydraulic fluid into the reservoir in the middle of the stroke of the piston rod to thereby hold the piston in the desired position relative to the cylinder, wherein the piston position holding unit comprises the orifice which is opened in the passage of the pump rod and which is connected to the reservoir, the closing portion which is formed at the distal end side of the inner sleeve for closing the orifice in at least two positions which differ in the axial direction, and the actuator which is connected to the inner sleeve for rotating the inner sleeve relative to the piston rod through the angle which corresponds to the closing portion. By adopting this configuration, not only can the reaction force to the external force be damped, but also the piston can be held in the desired position which corresponds to the closing portion relative to the cylinder. Consequently, when the damper unit is disposed between springs of a suspension system of a motor vehicle, for example, the damper unit can not only damp the vibration of the springs but also control the vehicle height to stay at a desired height.

Since the space corresponding to the distance over which the male screw member travels becomes unnecessary, the configuration of the damper unit becomes simple, and hence, the layout of the damper unit becomes easy even when the damper unit is attempted to be disposed within the limited space such as the wheel house, for example.

In the damper unit according to the second aspect of the invention, the groove having the predetermined axial length is provided in the pump rod so as to connect to ether of the two chambers, and the orifice is made to be opened in the pump rod in the arbitrary position within the predetermined axial length of the groove so as to change its angle in the radial direction. Therefore, in causing the hydraulic fluid to flow to at least either of the two chambers via the passage in the pump rod by the pumping operation, when the piston reaches the predetermined position relative to the ump rod, the hydraulic fluid can be caused to flow to either of the two chambers via the groove, and the pumping operation is not prolonged more than necessary.

In the damper unit according to the third aspect of the invention, the piston position holding unit comprises the orifice which is provided in the passage in the pump rod so as to connect to the reservoir, the closing portion which is formed at the distal end side of the inner sleeve for closing the orifice, at least the primary groove portion which is formed on the inner circumferential surface of the inner sleeve and at least the two secondary groove portions which are formed in the different positions in the axial direction on the outer circumferential surface of the pump rod and the actuator which is connected to the inner sleeve for rotating the inner sleeve relative to the piston rod through the angle at which the primary groove portion generates the radial gap with the secondary groove portions which are formed in the pump rod. By adopting this configuration, not only can the reaction force to the external force be damped, but also the piston can be held in the desired position relative to the cylinder particularly in the contracting or bumping direction. Consequently, when the damper unit is disposed between springs of a suspension system of a motor vehicle, for example, the damper unit can not only damp the vibration of the springs but also lower (control) the vehicle height to a desired height.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 6A to 6C are explanatory views illustrating a vehicle height controlling operation by the damper unit shown in FIG. 1;

FIGS. 7A and 7B are side views of the main body of the damper unit shown in FIG. 1;

FIGS. 11A to 11C are Enlarged views of portions which are defined by broken lines in FIG. 10.

DETAILED DESCRIPTION OF THE INVENTION

Hereinafter, referring to the accompanying drawings, a mode for carrying out a damper unit according to the invention will be described.

Embodiment 1

Figure 1:
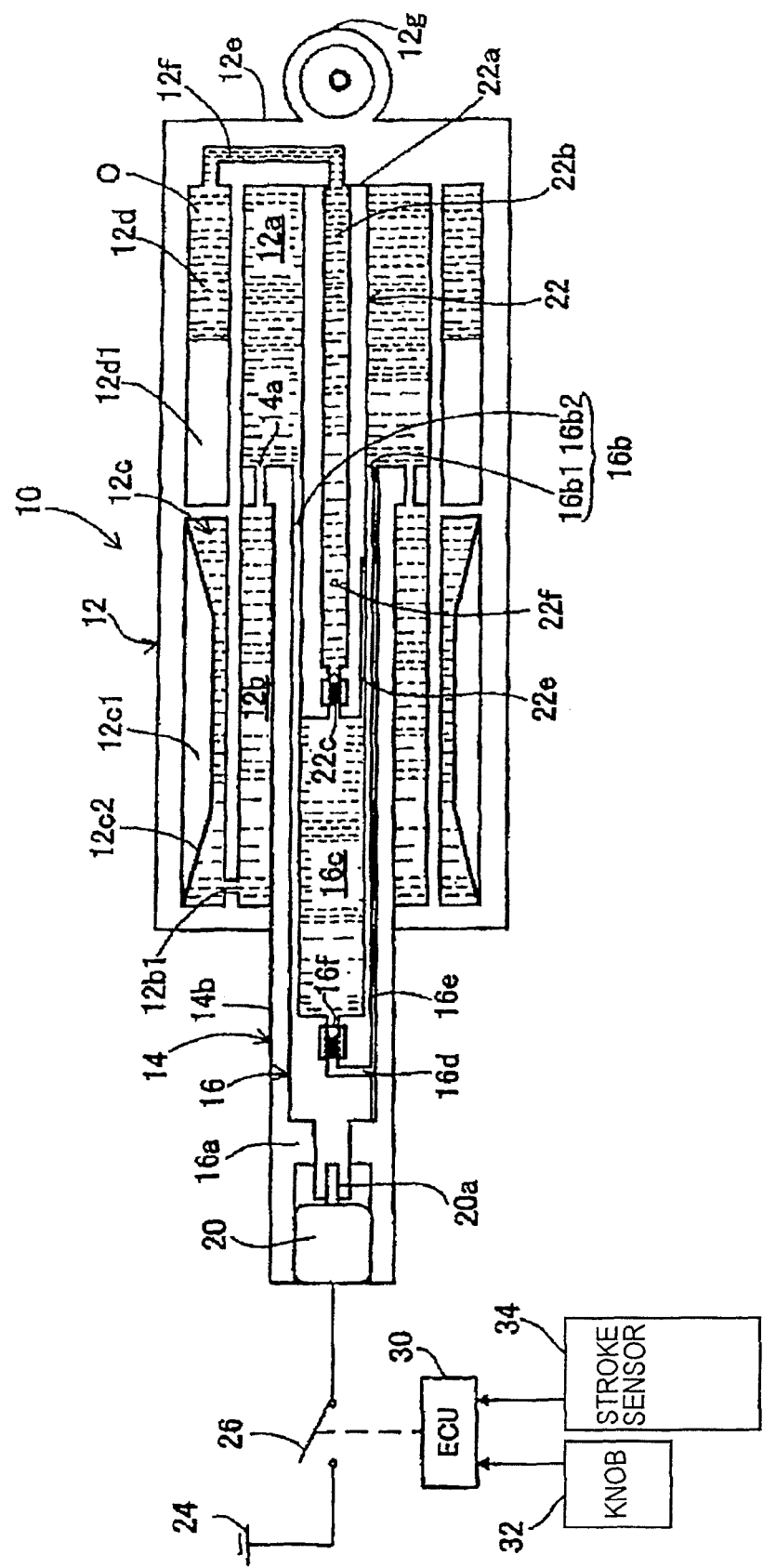
FIG. 1 is an overall view showing exemplarily a damper unit according to a first embodiment of the invention.

Reference numeral 10 denotes a damper unit in FIG. 1 and other figures. As is shown therein, the damper unit 10 includes a cylinder 12 having a circular cylindrical shape and a piston 14 which is disposed slidably within the cylinder 12. The damper unit 10 is disposed between springs (not shown) in a suspension system for a rear wheel of a motor vehicle.

A working or hydraulic oil (hydraulic fluid) is sealed in an interior of the cylinder 12 and the interior of the cylinder 12 is divided into two chambers made up of a primary oil chamber 12a and a secondary oil chamber 12b by the piston 14. A communication path 14a is provided in the piston 14, and the hydraulic oil flows (back and forth) from one to the other of the primary and secondary oil chambers 12a, 12b via the communication path 14a.

In the cylinder 12, a tertiary oil chamber 12c and a reservoir 12d are formed on an outside (a circumferential side) of the primary and secondary oil chambers 12a, 12b, and a diaphragm (a bladder) 12c2 in which a high-pressure inactive gas 12c1 is sealed is provided in the tertiary oil chamber 12c.

The secondary oil chamber 12b is connected with the tertiary oil chamber 12c via an orifice (a hole) 12b1, and as a result, the pressure of the high-pressure gas 12c1 is applied to the hydraulic oil in the primary, secondary and tertiary oil chambers 12a, 12b, 12c.

A working or hydraulic oil O is stored in the reservoir 12d. A low-pressure gas 12d1 is sealed in the reservoir 12d, whereby the pressure of the low-pressure gas 12d1 is applied to the hydraulic oil stored in the reservoir 12d. This low-pressure gas 12d1 is lower in pressure than the high-pressure gas 12c1 and is similarly made up of an inactive gas. For the sake of simplifying illustration in the drawings, the illustration of the hydraulic oil O is omitted in FIG. 2 onwards.

A piston rod 14b is connected to the piston 14. The piston rod 14b is connected to the piston 14 at one end and is caused to extend to the outside of the cylinder 12 at the other end. The piston rod 14b exhibits a circular cylindrical shape and has a hollow recess portion formed in an axial direction therein.

An inner sleeve 16 is accommodated in the piston rod 14b. The inner sleeve 16 is accommodated rotatably within the hollow recess portion in the piston rod 14b on one hand. On the other hand, the inner sleeve 16 is caused to project from a distal end of the piston rod 14b. A projecting portion 16a of the inner sleeve 16 is connected to an output shaft 20a of an actuator (which is made up of an electric motor such as a stepping motor, for example) 20, whereby the inner sleeve 16 is made to rotate freely relative to the piston rod 14b by the actuator 20. The actuator 20 is fixed to the piston rod 14b.

As with the piston rod 14b, the inner sleeve 16 exhibits a circular cylindrical shape and has a hollow recess portion 16c, functioning as an oil path for the hydraulic oil, which is formed to extend along almost its overall length from the projecting portion 16a to the distal end 16c excluding a portion in proximity to the projecting portion 16a. The hollow recess portion 16c is connected to a thin hole 16d.

Further, as is shown well in FIG. 1, a groove 16e is formed around an outer circumference of the inner sleeve 16 so as to extend along almost its overall length, and when the inner sleeve 16 is accommodated in the piston rod 14b, a gap is designed to be defined with the piston rod 14b at the groove 16e.

The thin hole 16d extends in an axial direction towards the projecting portion 16a and is then bent through 90 degrees to extend further in a radial direction for connection to the groove 16e. A one-way valve (a check valve) 16f is disposed in the thin hole 16d. As is shown well in FIG. 2, the one-way valve 16f includes a valve element 16f1 and a spring 16f2 and permits the hydraulic oil to flow only in a direction from the distal end 16b towards the projecting portion 16a.

A pump rod 22 is fixed to an axial center position of the cylinder 12. The pump rod 22 is fixed integrally to a bottom 12e of the cylinder 12 at a bottom end (one end) 22a thereof and is inserted into the hollow recess portion in the inner sleeve 16 in a fluid-tight fashion at the other end. In other words, the pump rod 22 is inserted in an interior of the inner sleeve 16 from the distal end 16b side of the inner sleeve 16 in the fluid-tight fashion.

At an axial center of the pump rod 22, an oil path (a passage) 22b is formed so as to extend in an axial direction along an overall length of the pump rod 22. The oil path 22b is connected to the reservoir 12d via the oil path 12f. A one-way valve (a check valve) 22c is disposed in the oil path 22b.

Figure 2:
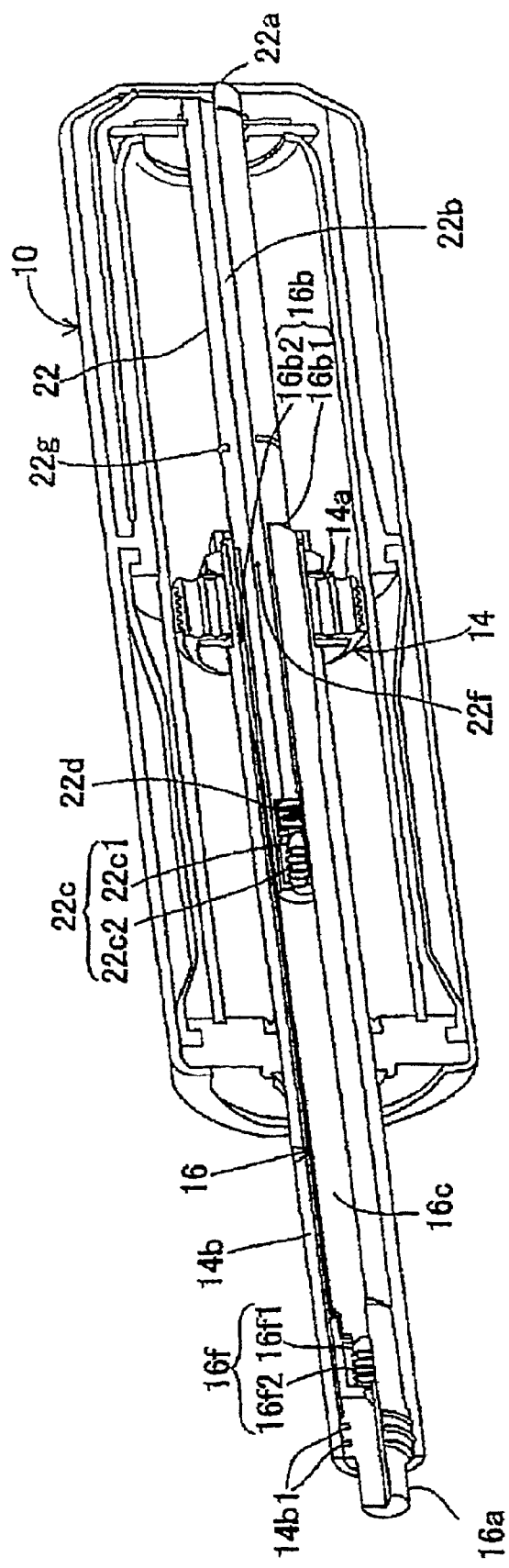
FIG. 2 is an enlarged perspective view of a main body of the damper unit in a vertical section showing more specifically the damper unit.
Figure 3:
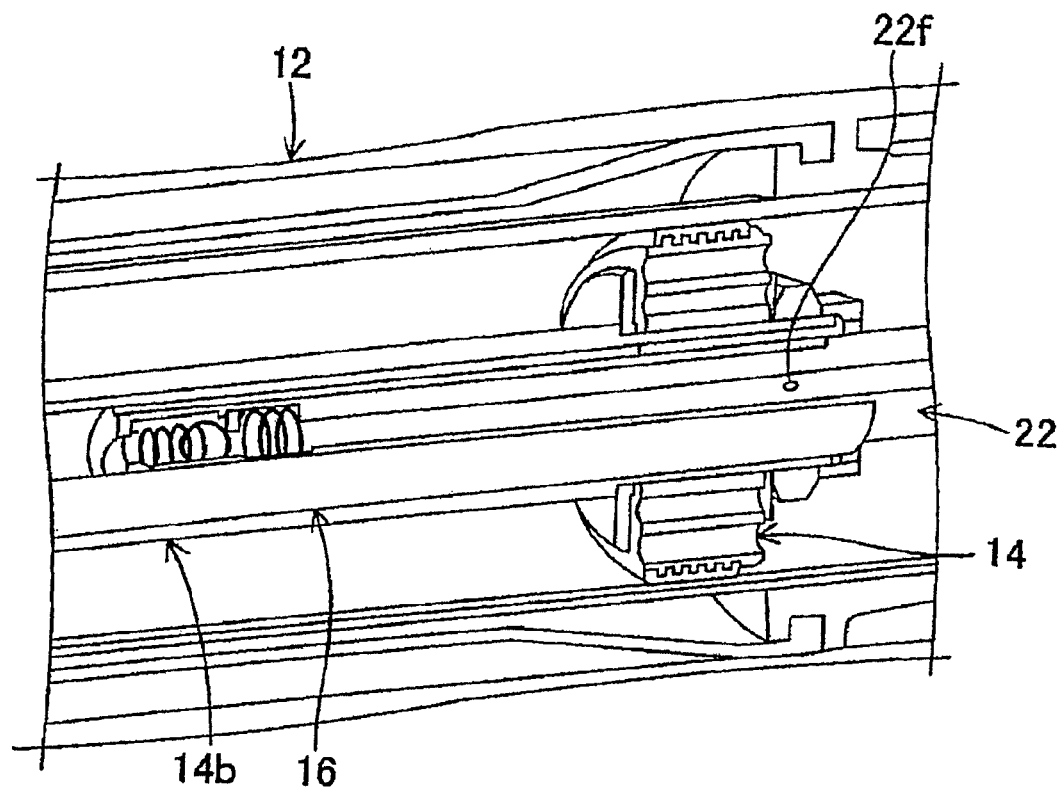
FIG. 3 is an enlarged view of a main part of the main body of the damper unit shown in FIG. 2.

As is shown well in FIG. 2, the one-way valve 22c also includes a valve element 22c1 and a spring 22c2 and permits the hydraulic oil to flow only in a direction from the oil path 22b towards the hollow recess portion 16c of the inner sleeve 16.

Consequently, the hydraulic oil stored in the reservoir 12d flows to the oil path 22b via the oil path 12f, passes through the one-way valve 22c to flow from the hollow recess portion 16c to the thin hole 16d in the inner sleeve 16, passes through the one-way valve 16f to flow to the groove 16e and flows from the groove 16e to the primary oil chamber 12a. Following this, the hydraulic oil flows from the primary oil chamber 12a to the secondary oil chamber 12b and passes through the orifice 12b1 to flow to the tertiary oil chamber 12c.

A valve holding spring 22d (shown only in FIG. 2) is connected to the one-way valve 22c in the oil path 22b in the pump rod 22. The valve holding spring 22d mitigates an input of shock during a pumping operation in which the piston 14 moves vertically relative to the cylinder 12.

Figure 5:
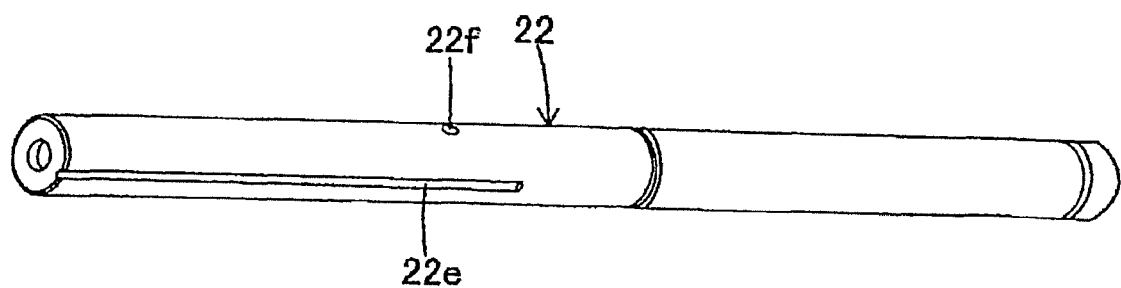
FIG. 5 is a perspective view of a pump unit of the main body of the damper unit shown in FIG. 2.

As is shown well in FIG. 1 and others, a groove 22e is formed around an outer circumference of the pump rod 22 so as to extend in the axial direction. The groove 22e has a predetermined axial length, and as is shown well in FIG. 5, an orifice 22f is opened in the pump rod 22 in an arbitrary position within the axial length of the groove 22e or more specifically in a position which is situated in proximity to an end portion which lies closer to the bottom end 22a of the groove 22e and which deviates angularly (at about 90 degrees) from the groove 22e in a radial direction.

Figure 4:
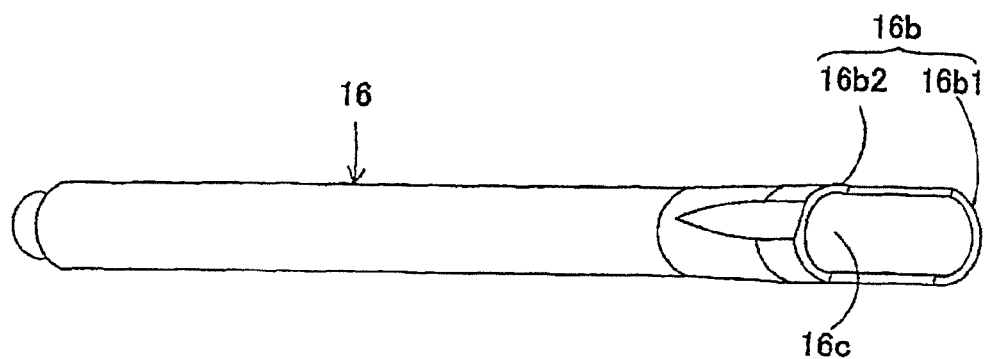
FIG. 4 is a perspective view of an inner sleeve of the main body of the damper unit shown in FIG. 2.

On the other hand, as is shown in FIG. 4, the distal end 16b side of the inner sleeve 16 where the pump rod 22 is accommodated exhibits a shape in which semicircular (180-degree) portions are cut in a radial direction in two stages and is configured so as to have two long and short axial end positions 16b1, 16b2.

In addition, as is shown in FIG. 2, the piston rod 14b and the inner sleeve 16 are sealed fluid-tightly by an O ring 14b1, and an O ring 22g is fitted on the pump rod 22 so as to establish a fluid-tight seal between the pump rod 22 and the inner sleeve 16.

As has been described heretofore, since the pump rod 22 is accommodated in the inner sleeve 16 fluid-tightly, as long as the axial end position 16b1 or 16b2 of the distal end 16b of the inner sleeve 16 rides over the orifice 22f in the direction of the bottom end 22a in the axial direction, the orifice 22f is closed by the axial end position 16b1 or 16b2 of the inner sleeve 16, whereby the hydraulic oil is prevented from passing through the orifice 22f to flow into the primary and secondary oil chambers 12a, 12b.

In this way, the long and short axial end positions (closing portions) 16b1, 16b2 are formed at the distal end 16b of the inner sleeve 16 which can close the orifice 22f of the pump rod 22 at least two positions which differ in the axial direction.

In the damper unit 10, the piston rod 14b is connected to a body side of the vehicle, and the cylinder is connected to an unsprung member of the suspension system via a bush 12g, whereby a reaction force to a displacement of the piston 14 relative to the cylinder 12 by an external force attributed to a road surface of an acceleration or deceleration of the vehicle is damped and the vibration of the springs of the suspension system is damped.

Next, referring to FIGS. 6A to 6C, a vehicle height controlling operation by the damper unit 10 will be described. FIG. 6A shows an unloaded vehicle condition in which neither passenger nor luggage is loaded in the vehicle, FIG. 6B shows a loaded vehicle condition in which passengers and luggage are loaded in the vehicle with a vehicle height set low, and FIG. 6C shows a loaded vehicle condition in which the vehicle is similarly loaded with the vehicle height set high.

As is shown in FIG. 6B, in an extension or rebound stroke of the damper unit 10, when the piston 14b reciprocates (is displaced) relative to the cylinder 12 due to the external force attributed to the road surface or acceleration or deceleration of the vehicle, the hydraulic oil flows out of the reservoir 12d, passes through the oil path 12f, passes through the oil path 22b in the pump rod 22 and reaches the hollow recess portion 16c in the inner sleeve 16.

Following this, as is shown in FIG. 6C, in a contraction or bump stroke of the damper unit 10, the hydraulic oil in the hollow recess portion in the inner sleeve 16 passes through the one-way vale 16f to flow through the thin hole 16d and the groove 16e, flows sequentially into the primary oil chamber 12a and the secondary oil chamber 12b and further passes through the orifice 12b1 to flow finally into the tertiary oil chamber 12c, whereby the amount oil in the inner sleeve 16 is reduced.

By the reciprocating motion described above being repeated, the hydraulic oil is supplied from the reservoir 12d to the primary, secondary and tertiary oil chambers 12a, 12b, 12c, whereby the high-pressure gas 12c1 in the interior of the diaphragm 12c2 is compressed. Since the inner pressure in the diaphragm 12c2 is increased by virtue of compression of the high-pressure gas 12c1, a force acting to push the piston 14 outwards of the cylinder 12 is increased, whereby the damper unit 10 is extended as a whole.

This condition continues until the axial end position 16b1 or 16b2 of the inner sleeve 16 rides over the orifice 22f towards the bottom end 22a side whereby the orifice 22f is closed by the inner sleeve 16.

On the other hand, when the orifice 22f passes the axial end position 16b1 or 16b2 of the inner sleeve 16 in the axial direction towards the bottom end 22a side, the orifice 22f is opened, and the hydraulic oil immediately passes through the orifice 22f to flow into the reservoir 12d, as a result of which the displacement of the piston rod 14b relative to the pump rod 22, in other words, the vehicle height control is completed, whereby the damper unit 10 is held at the height resulting then.

This means that the height of the damper unit 10 can be controlled to stay at a height corresponding to a selected position by the opening or closure of the orifice 22f being made to be selected by the two long and short axial end positions 16b1, 16b2.

Consequently, in this embodiment, the actuator 20 is connected to the inner sleeve 16 so as to rotate the inner sleeve 16 relative to the piston rod 14b through an angle which corresponds to either of the two long and short axial end positions 16b1, 16b2, as is shown in FIGS. 7A and 7B.

FIG. 7A is an explanatory view when the rotational angle of the inner sleeve is 0 degree (the inner sleeve 16 is not rotated) and FIG. 7B is an explanatory view when the rotational angle of the inner sleeve 16 is 180 degrees (the inner sleeve 16 is rotated half one full rotation). As is clear from FIGS. 7A and 7B, when the inner sleeve 16 is rotated through 180 degrees, the orifice 22f can be closed to a position lying closer to the bottom end 22a, in other words, to a position where the piston rod 14b extends longer relative to the cylinder 12, compared with when the inner sleeve 16 is not rotated.

As is shown in FIG. 1, the actuator 20 is connected to a battery (a vehicle's on-board power supply) 24, and a switch 26 is provided in a position along the length of an energization path. The switch 26 is opened or closed by an electronic control unit (hereinafter, referred to as an "ECU") 30 which is made up of a microcomputer.

In addition, a knob 32 is provided in an appropriate position in proximity to a driver's seat of the vehicle. The knob 32 can be operated by the driver and is designed to indicate target vehicle heights which include two high and low vehicle height positions. In addition, a stroke sensor 34 is disposed in proximity to the springs of the suspension system for generating an output which is in proportion to a body stroke, that is, a vertical movement of the vehicle resulting from extension or contraction of the springs of the suspension system.

Outputs of the knob 32 and the stroke sensor 34 are inputted into the ECU 30. When judging from an output from the stroke sensor 34 that there exists no problem, the ECU 30 determines the operation of the actuator 20 to provide a target vehicle height according to an intention of the driver which is inputted through the knob 32 and opens or closes the switch 26.

Since the damper unit 10 according to the embodiment is configured as has been described heretofore, the damper unit 10 can not only damp the reaction force to the external force acting on the damper unit 10 but also hold the piston 14 in the desired position which corresponds to either of the two axial end positions (closing portions) 16b1, 16b2 relative to the cylinder 12. When the damper unit 10 is disposed between the springs of the suspension system of the vehicle, the damper unit 10 can control the vehicle height to stay at a height corresponding to either of the two axial end positions while damping the vibration of the springs.

In addition, the configuration of the damp unit 10 becomes simple, and even when attempting to dispose the damper unit 10 in the limited space such as the wheel house, the layout of the damp unit 10 becomes easy, and there is no such situation that the pumping operation is prolonged longer than necessary.

Embodiment 2

Figure 8:
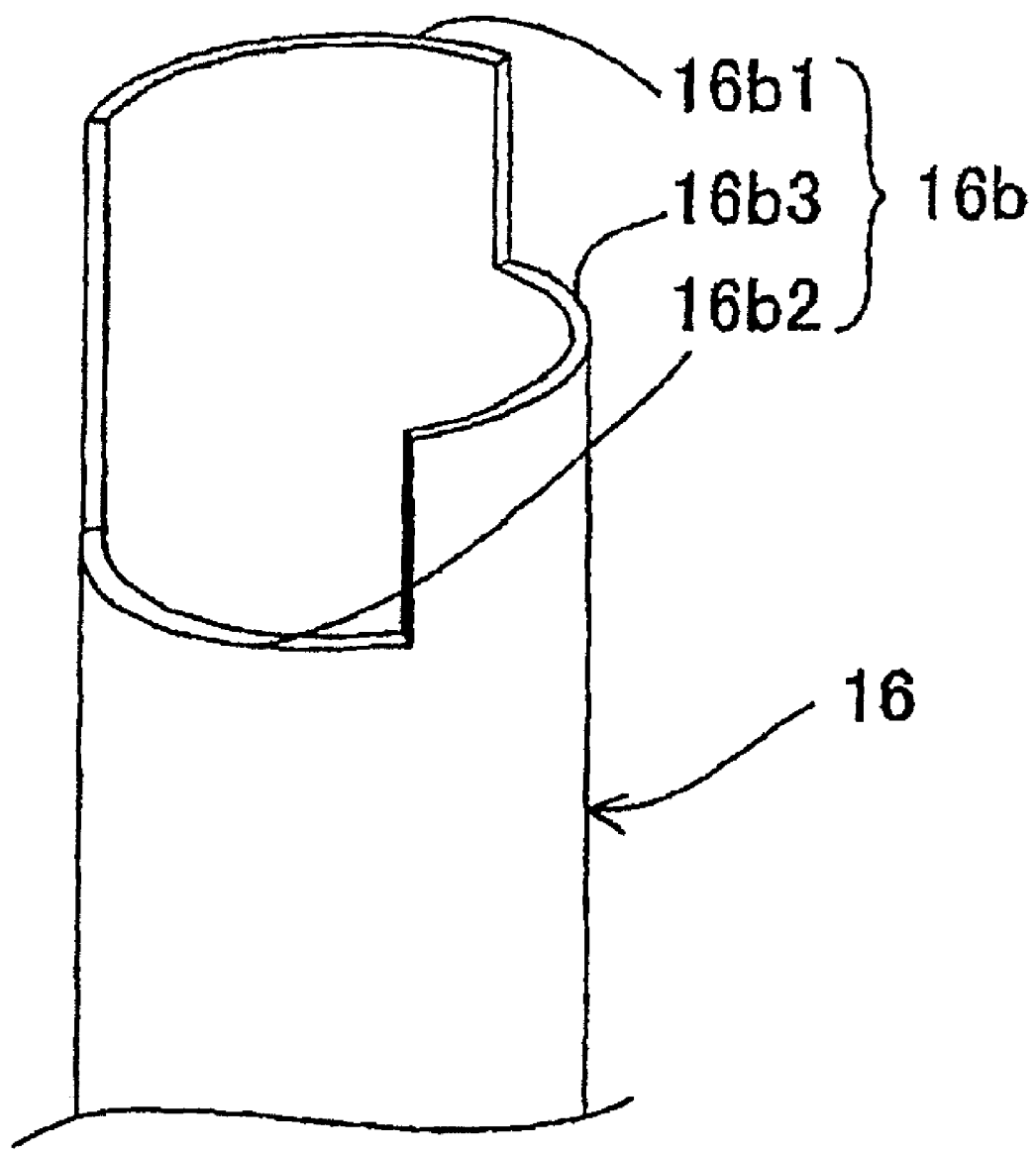
FIG. 8 is a perspective view showing exemplarily a distal end of an inner sleeve of a damper unit according to a second embodiment of the invention.

FIG. 8 is a perspective view of a distal end 16b of an inner sleeve of a damper unit according to a second embodiment of the invention, which is partially similar to FIG. 4.

What differs from the first embodiment will mainly be described. In the damper unit according to the second embodiment, as is shown in the figure, the distal end 16b of the inner sleeve 16 exhibits a shape which is configured in three stages in an axial direction and is designed to have three positions including an intermediate axial end portion 16b3 in addition to two long and short axial end positions 16b1, 16b2.

In this way, in the damper unit 10 according to the second embodiment, the piston position holding unit is configured so as to have the third intermediate axial end position (the closing portion) 16b3 in addition to the two long and short axial end positions (the closing portions) 16b1, 16b2 which are formed at the distal end 16b side of the inner sleeve 16 for closing an orifice 22f in two positions which differ from each other in the axial direction. By adopting this configuration, the vehicle height can be controlled to stay at a height corresponding to any of the three axial end positions 16b1, 16b2, 16b3. As a result, the vehicle height can be controlled at narrower intervals so as to satisfy the instruction (intention) of the driver. The remaining configurations and advantages remain the same as those of the first embodiment.

Embodiment 3

Figure 9:
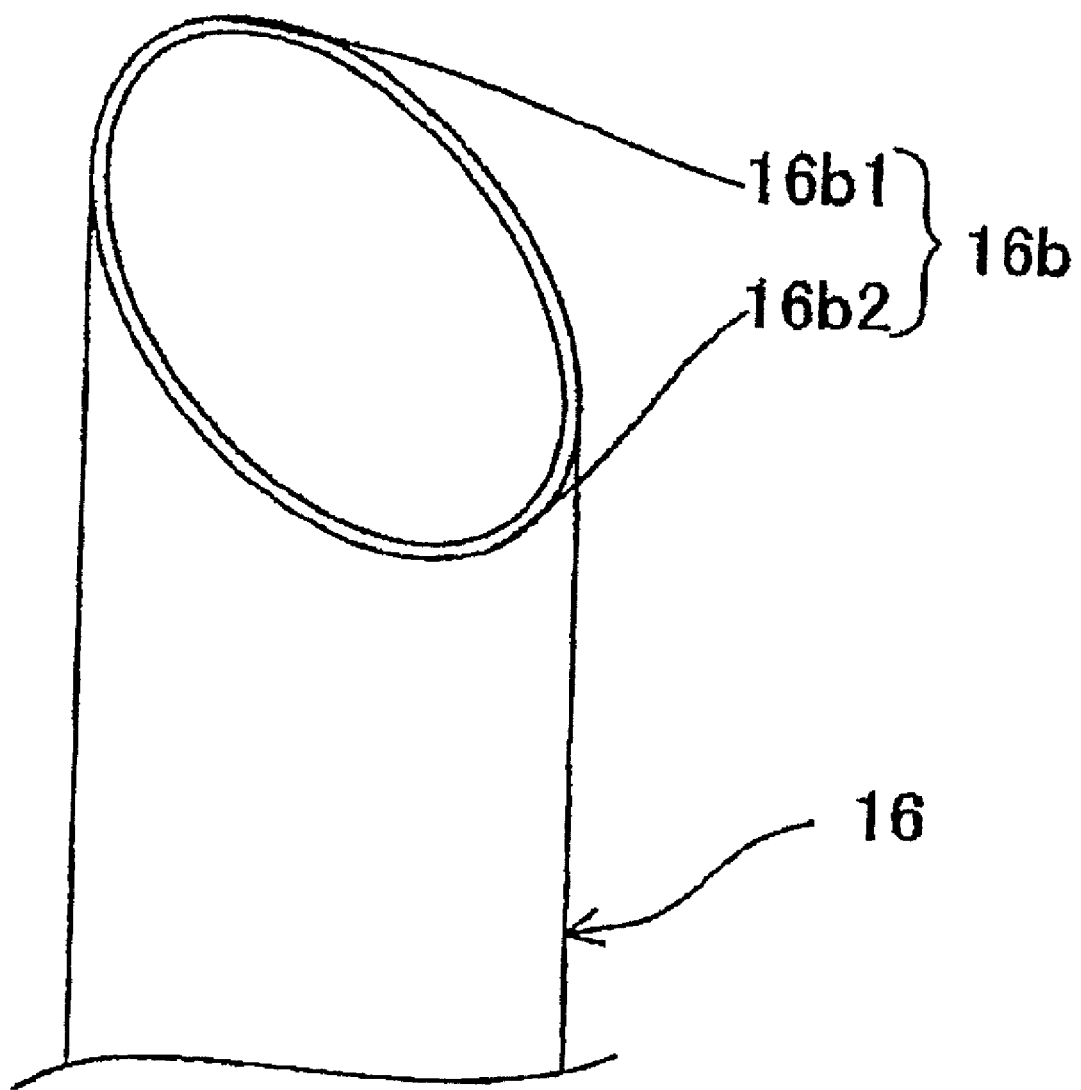
FIG. 9 is a perspective view showing exemplarily a distal end of an inner sleeve of a damper unit according to a third embodiment of the invention.

FIG. 9 is a perspective view of a distal end 16b of an inner sleeve 16 of a damper unit according to a third embodiment of the invention, which is partially similar to FIG. 4.

What differs from the first embodiment will mainly be described. In the damper unit according to the third embodiment, as is shown in the figure, the distal end 16b of the inner sleeve 16 exhibits a shape which changes continuously in an axial direction between two long and short axial positions 16b1, 16b2 and is configured so as to have an arbitrary intermediate position between the two long and short axial end positions 16b1, 16b2 in addition thereto.

In this way, in the damper unit 10 according to the third embodiment, the piston position holding unit is configured so as to have the arbitrary intermediate axial end position (the closing portion) between the two long and short axial end positions (the closing portions) 16b1, 16b2 which are formed at the distal end 16b side of the inner sleeve 16 for closing an orifice 22f in two positions which differ from each other in the axial direction in addition to the two axial end positions 16b1, 16b2. By adopting this configuration, the vehicle height can be controlled accurately to stay at a height corresponding to any of the two axial end positions 16b1, 16b2 and the intermediate axial end position lying therebetween. As a result, the vehicle height can be controlled at narrower intervals so as to satisfy the instruction (intention) of the driver. The remaining configurations and advantages remain the same as those of the first embodiment.

In the first to third embodiments that are configured as has been described heretofore, there is provided the damper unit in which the interior of the cylinder 12 which is connected to the reservoir 12d and in which the hydraulic oil (the hydraulic fluid) is sealed is divided into the primary oil chamber 12a and the second oil chamber 12b (the two chambers) by the piston 14 and the hydraulic oil is made to flow from one to the other of the primary oil chamber 12a and the secondary oil chamber 12b (the two chambers) so as to damp the reaction force to the displacement of the piston 14 relative to the cylinder 12 by the external force, comprising the piston rod 14b which is connected to the piston 14 at one end and which is caused to extend outwards of the cylinder 12 at the other end and in which the hollow recess portion is opened in the axial direction, the inner sleeve 16 which exhibits the cylindrical shape and which is accommodated rotatably within the hollow recess portion in the piston rod 14b, the pump rod 22 which is fixed to the bottom 12e of the cylinder 12 at one end (bottom end) 22a while being inserted into the interior of the inner sleeve 16 from the distal end 16b side at the other end and in which the oil path (the passage) 22b is opened in the interior thereof, the pump unit (the one-way valves 16f, 22c, the thin hole 16d, the groove 16e and the orifice 12b1) which causes the hydraulic oil to flow from the reservoir 12d to at least either of the primary oil chamber 12a and the secondary oil chamber 12b (the two chambers) via the oil path when the pump rod 22 is displaced relative to the inner sleeve 16 in response to the stroke of the piston rod 14b so as to cause the piston 14 to perform pumping relative to the cylinder 12, and the piston position holding unit which causes the pump unit to discharge the hydraulic oil into the reservoir 12d in the middle of the stroke of the piston rod 14b to thereby hold the piston 14 in the desired position relative to the cylinder 12, wherein the piston position holding unit comprises the orifice 22f which is opened in the passage of the pump rod 22 and which is connected to the reservoir 12d, the closing portion which is formed at the distal end 16b side of the inner sleeve 16 for closing the orifice 22f in at least the two positions 16b1, 16b2 which differ in the axial direction, more specifically, the closing portion for closing the orifice 22f in at least the two positions 16b1, 16b2 which differ in the axial direction and the arbitrary position including the intermediate position 16b3 lying between the two positions, and the actuator 20 which is connected to the inner sleeve 16 for rotating the inner sleeve 16 relative to the piston rod 14b through the angle (0 degree or 180 degrees) which corresponds to the closing portion.

By adopting this configuration, not only can the reaction force to the external force acting on the damper unit 10 be damped, but also the piston 14 can be held relative to the cylinder 12 in the desired position which includes the two axial end positions 16b1, 16b2 and the intermediate position therebetween.

Consequently, when the damper unit is disposed between springs of a suspension system of a motor vehicle, the damper unit can not only damp the vibration of the springs but also control the vehicle height to stay at a desired height. In addition, the vehicle height control can be implemented in accordance with the instruction (intention) of the driver.

In addition, since the space corresponding to the distance over which the male screw member travels becomes unnecessary, the configuration of the damper unit becomes simple, and hence, the layout of the damper unit becomes easy even when the damper unit is attempted to be disposed within the limited space such as the wheel house.

In addition, the groove 22e having the predetermined axial length is provided in the pump rod 22 so as to connect to ether of the primary oil chamber 12a, the secondary oil chamber 12b and the tertiary oil chamber 12c, and the orifice 22f is made to be opened in the pump rod in the arbitrary position within the predetermined axial length of the groove 22e so as to change its angle (for example, through about 90 degrees) in the radial direction. Therefore, in causing the hydraulic oil to flow from the reservoir 12d to at least any of the primary oil chamber 12a, the secondary oil chamber 12b and the tertiary oil chamber 12c via the oil path 22b in the pump rod 22 by the pumping operation, the hydraulic oil can immediately be caused to flow to any of the primary oil chamber 12a, the secondary oil chamber 12b and the tertiary oil chamber 12c, and the pumping operation is not prolonged more than necessary.

Embodiment 4

Figure 10:
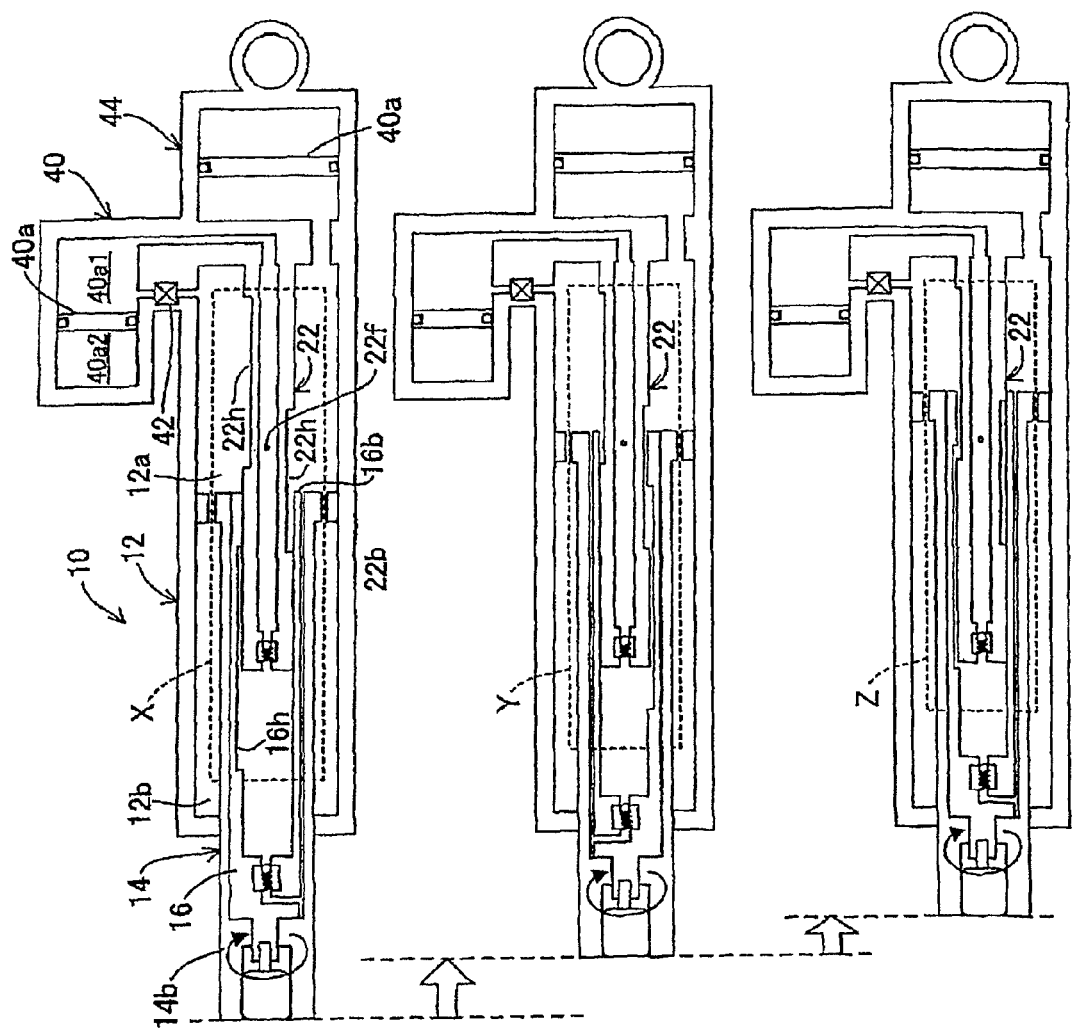
FIG. 10 is a overall view showing exemplarily a damper unit according to a fourth embodiment of the invention.

FIG. 10 shows overall views showing exemplarily a damper unit according to a fourth embodiment of the invention, and FIG. 11 shows enlarged views of portions which are defined by broken lines X, Y, Z in FIG. 10.

In the first to third embodiments, while the height of the damper unit 10 is described as being controlled in the direction in which the piston rod 14b is pushed upwards by virtue of the pumping operation, that is, as being controlled in the direction in which the vehicle height which is being lowered by load loaded on the vehicle is restored to the desired (designed) height, the same thing is applied to a case where the damper unit 10 is controlled to lower the vehicle height by pushing the piston rod 14b downwards by the pumping operation.

The fourth embodiment relates to a damper unit having a configuration in which a piston rod 14b is pushed downwards by such a pumping operation. For this purpose, the damper unit includes, as a piston position holding unit, in addition to an orifice 22f and distal end (a closing portion) 16b of an inner sleeve 16, at least one primary groove portion 16h which is formed on an inner circumferential surface of the inner sleeve 16 and at least two secondary groove portions 22h which are formed in different positions in an axial direction on an outer circumferential surface of a pump rod 22. An actuator 20 is configured so as to rotate the inner sleeve 16 relative to the piston rod 14 through an angle at which the primary groove portion 16h generates a radial gap with the secondary groove portion 22h.

In the damper unit 10 according to the fourth embodiment, a primary oil chamber 12a and an oil path 22b of the pump rod 22 are connected to a free piston chamber 40. A free piston 40a is disposed slidably in the free piston chamber 40 so as to divide the free piston chamber 40 into two chambers 40a1, 40a2 in FIG. 10.

The primary oil chamber 12a and the oil path 22b of the pump rod 22 are connected to the chamber 40a1, which is one of the two chambers so divided. An electromagnetic solenoid valve 42 is disposed in a position along the length of a connection path which connects the primary oil chamber 12a with the chamber 40a1. Further, the primary oil chamber 12a is connected to a secondary free piston chamber 44. A free piston 44a is also disposed slidably in the secondary free piston chamber 44.

Namely, the damper unit according to the fourth embodiment includes a reservoir which is made up of the free piston chamber 40 and the electromagnetic solenoid valve 42, in place of the high-press gas. In addition, the damper unit includes, as a piston position holding unit, the primary and secondary groove portions 16h, 22h in addition to the orifice 22f and the distal end (the closing portion) 16b of the inner sleeve 16. The remaining configurations remain the same as those of the first embodiment.

FIG. 10 shows a state resulting before the vehicle starts in which the electromagnetic solenoid valve 42 is opened and the vehicle height is relatively high, a state resulting while the vehicle is running (after pumping) in which the electromagnetic solenoid valve is closed and the actuator 20 is rotated to lower the vehicle height, and a state resulting while the vehicle is running (after pumping) in which the electromagnetic solenoid valve is closed and the actuator 20 is rotated to lower the vehicle height further, beginning at the top.

By this configuration, as is shown in FIGS. 11A to 11C which are enlarged views of the corresponding views in FIG. 10, since the positional relationship between the primary groove portion 16h and the secondary groove portions 22h are changed, the releasing position of the hydraulic oil is changed, thereby making it possible to control the lowering amount of the vehicle.

In this way, in the fourth embodiment, there is provided the damper unit in which the interior of the cylinder 12 which is connected to the reservoir (the free piston chamber 40, the electromagnetic solenoid valve 42) and in which the hydraulic oil (the hydraulic fluid) is sealed is divided into the two chambers (the primary oil chamber 12a, the secondary oil chamber 12b) by the piston 14 and the hydraulic oil is made to flow from one to the other of the two chambers so as to damp the reaction force to the displacement of the piston 14 relative to the cylinder 12 by the external force, comprising the piston rod 14b which is connected to the piston 14 at one end and which is caused to extend outwards of the cylinder 12 at the other end and in which the hollow recess portion is opened in the axial direction, the inner sleeve 16 which exhibits the cylindrical shape and which is accommodated rotatably within the hollow recess portion in the piston rod 14b, the pump rod 22 which is fixed to the bottom 12e of the cylinder 12 at one end while being inserted into the interior of the inner sleeve 16 from the distal end side at the other end and in which the passage (the oil path) 22b is opened in the interior thereof, the pump unit which causes the hydraulic oil to flow from the reservoir 12d to at least either of the two chambers via the oil path when the pump rod 22 is displaced relative to the inner sleeve 16 in response to the stroke of the piston rod 14b so as to cause the piston 14 to perform pumping relative to the cylinder 12, and the piston position holding unit which causes the pump unit to discharge the hydraulic oil into the reservoir 12d in the middle of the stroke of the piston rod 14b to thereby hold the piston 14 in the desired position relative to the cylinder 12, wherein the piston position holding unit comprises the orifice 22f which is provided in the passage in the pump rod 22 so as to connect to the reservoir, the closing portion (the distal end 16b) which is formed at the distal end side of the inner sleeve 16 for closing the orifice 22f, at least the primary groove portion 16h which is formed on the inner circumferential surface of the inner sleeve 16 and at least the two secondary groove portions 22h which are formed in the different positions in the axial direction on the outer circumferential surface of the pump rod 22 and the actuator 20 which is connected to the inner sleeve 16 for rotating the inner sleeve 16 relative to the piston rod 14b through the angle at which the primary groove portion 16h generates the radial gap with the secondary groove portions 22h which are formed in the pump rod 22.

By adopting this configuration, as with the previous embodiments, not only can the reaction force to the external force be damped, but also the piston 14 can be held in the desired position relative to the cylinder 12 particularly in the contracting or bumping direction. Consequently, when the damper unit is disposed between springs of a suspension system of a motor vehicle, for example, the damper unit can not only damp the vibration of the springs but also lower (control) the vehicle height to a desired height.

In addition, in the embodiment, while the damper unit 10 is described as being disposed between the springs of the suspension system of the rear wheel of the motor vehicle, the damper unit according to the invention may be disposed on a front wheel, and further, the damper unit according to the invention is not limited to the application for motor vehicles.

What is claimed is:

1. A damper unit, comprising:
    a cylinder, connected to a reservoir, in which a hydraulic fluid is sealed;
    a piston dividing an interior of the cylinder into two chambers, the two chambers configured to pass the hydraulic fluid from one to the other so as to damp vibration from an outside;
    a piston rod which is connected to the piston at one end, while being caused to extend outwards of the cylinder at the other end and in which a hollow recess portion is provided in an axial direction;
    an inner sleeve which exhibits a cylindrical shape and which is adapted to be accommodated rotatably within the hollow recess portion in the piston rod;
    a pump rod which is provided at an axial end portion of an inner circumferential surface of the cylinder at one end, while being inserted into an interior of the inner sleeve from a distal end side at the other end and in an interior of which a passage is provided;
    a pump unit configured to perform pumping for generating a force with which the piston is pushed out of the cylinder or the piston is drawn into the cylinder by moving the hydraulic fluid in the inner sleeve and the pump rod by a change in relative position between the inner sleeve and the pump rod which is triggered in association with a stroke of the piston rod;
    a hydraulic fluid releasing unit configured to release the hydraulic fluid within the inner sleeve and the pump rod to the reservoir or the two chambers when the piston reaches a predetermined position relative to the cylinder within a sliding range thereof by pumping of the pump unit; and
    a control unit configured to control the predetermined position where the hydraulic fluid is released by the hydraulic fluid releasing unit.

2. The damper unit according to claim 1, wherein
    the hydraulic fluid releasing unit comprises:
    an orifice provided in a passage through which the hydraulic fluid flows on an inner circumferential surface of the pump rod and communicating with the reservoir;
    a closing portion formed at a distal end side of the inner sleeve for closing the orifice in at least two positions which are different in an axial direction; and
    an actuator adapted to move the inner sleeve relative to the piston rod for controlling the position of the closing portion relative to the orifice.

3. The damper unit according to claim 2, wherein:
    the pump rod comprises a groove having a predetermined axial length for establishing a communication between the passage of the hydraulic fluid on the inner circumferential surface and either of the two chamber; and
    the hydraulic fluid releasing unit causes the actuator to establish a communication between a passage within the inner sleeve and the two chambers via the groove and establishes a communication between the reservoir and the two chambers via the orifice so as to release the hydraulic fluid within the inner sleeve and the pump rod.

4. The damper unit according to claim 3, wherein
    the orifice is provided in a position which lies within the axial length of the groove of the inner sleeve and which deviates in a radial direction from the groove.

5. The damper according to claim 3, wherein
    the actuator controls a relative position between the closing portion of the inner sleeve and the groove by rotating the inner sleeve in a circumferential direction.

6. The damper unit according to claim 1, wherein
    the piston position holding unit comprises:
    an orifice provided in a passage through which the hydraulic fluid flows on an inner circumferential surface of the pump rod and adapted to communicate with the reservoir;
    a closing portion formed at a distal end side of the inner sleeve for closing the orifice;
    at least one primary groove portion formed on an inner circumferential surface of the inner sleeve;
    at least two secondary groove portions formed in different positions in an axial direction on an outer circumferential surface of the pump rod; and
    an actuator connected to the inner sleeve for rotating the inner sleeve relative to the piston rod through an angle at which the primary groove portion generates a radial gap with the secondary grooves formed on the pump rod.

7. A method for controlling a height of a vehicle, comprising:
    providing a damper unit comprising: a cylinder, connected to a reservoir, in which a hydraulic fluid is sealed; a piston dividing an interior of the cylinder into two chambers, the two chambers configured to pass the hydraulic fluid from one to the other so as to damp vibration from an outside; a piston rod which is connected to the piston at one end, while being caused to extend outwards of the cylinder at the other end and in which a hollow recess portion is provided in an axial direction; an inner sleeve which exhibits a cylindrical shape and which is adapted to be accommodated rotatably within the hollow recess portion in the piston rod; and a pump rod which is provided at an axial end portion of an inner circumferential surface of the cylinder at one end, while being inserted into an interior of the inner sleeve from a distal end side at the other end and in an interior of which a passage is provided;
    pumping for generating a force with which the piston is pushed out of the cylinder or the piston is drawn into the cylinder by moving the hydraulic fluid in the inner sleeve and the pump rod by a change in relative position between the inner sleeve and the pump rod which is triggered in association with a stroke of the piston rod;
    releasing the hydraulic fluid within the inner sleeve and the pump rod to the reservoir or the two chambers when the piston reaches a predetermined position relative to the cylinder within a sliding range thereof by the pumping; and
    controlling the predetermined position where the hydraulic fluid is released.

8. The method according to claim 7, further comprising:
    providing an orifice provided in a passage through which the hydraulic fluid flows on an inner circumferential surface of the pump rod and communicating with the reservoir, and a closing portion formed at a distal end side of the inner sleeve for closing the orifice in at least two positions which are different in an axial direction; and moving the inner sleeve relative to the piston rod for controlling the position of the closing portion relative to the orifice.

9. The method according to claim 8, further comprising:
providing a groove having a predetermined axial length for establishing a communication between the passage of the hydraulic fluid on the inner circumferential surface and either of the two chamber;
establishing a communication between a passage within the inner sleeve and the two chambers via the groove; and
establishing a communication between the reservoir and the two chambers via the orifice so as to release the hydraulic fluid within the inner sleeve and the pump rod.

10. The method according to claim 9, wherein:
a relative position between the closing portion of the inner sleeve and the groove is controlled by rotating the inner sleeve in a circumferential direction.

* * * * *